United States Patent [19]
Vainio et al.

[11] Patent Number: 5,286,157
[45] Date of Patent: Feb. 15, 1994

[54] METHOD AND APPARATUS FOR STORING PAPER ROLLS IN A STORAGE SHELVING

[76] Inventors: Frans Vainio, Karhutie 6 O, SF-02400 Kirkkonummi, Finland; Walther Hilber, Griessbergweg 3, D-7142 Marbach, Fed. Rep. of Germany

[21] Appl. No.: 768,240
[22] PCT Filed: Nov. 14, 1988
[86] PCT No.: PCT/FI88/00185
§ 371 Date: Jul. 11, 1991
§ 102(e) Date: Jul. 11, 1991
[87] PCT Pub. No.: WO89/04284
PCT Pub. Date: May 18, 1989

[30] Foreign Application Priority Data
Nov. 12, 1987 [FI] Finland ................. 874991
Mar. 24, 1988 [DE] Fed. Rep. of Germany ....... 3809943

[51] Int. Cl.⁵ ................................ B65G 1/06
[52] U.S. Cl. .................... 414/273; 414/786; 414/279; 414/284; 414/283; 414/911; 364/478
[58] Field of Search ............ 414/265, 269, 273, 277, 414/786, 279, 281, 282, 283, 284, 286, 911, 910; 364/478; 242/58, 58.6

[56] References Cited
U.S. PATENT DOCUMENTS

| | | |
|---|---|---|
| 2,549,239 | 4/1951 | Robertson et al. |
| 3,738,506 | 6/1973 | Cornford et al. |
| 3,978,995 | 9/1976 | Zollinger et al. ........... 414/279 |
| 4,268,207 | 5/1981 | Pipes . |
| 4,395,181 | 7/1983 | Loomer . |
| 4,406,570 | 9/1983 | Duncan et al. |
| 4,459,078 | 7/1984 | Chiantella et al. |
| 4,505,630 | 3/1985 | Kaschner et al. |
| 5,067,871 | 11/1991 | Hilber . |

FOREIGN PATENT DOCUMENTS

| | | |
|---|---|---|
| 0075975 | 6/1985 | European Pat. Off. |
| 310714 | 4/1989 | European Pat. Off. |
| 3739222 | 5/1988 | Fed. Rep. of Germany . |
| 802035 | 2/1981 | Finland . |
| 476492 | 12/1952 | Italy . |
| 144681 | 11/1979 | Japan . |
| 110402 | 4/1989 | Japan ................. 414/273 |
| 82015538 | 7/1985 | Sweden . |
| 2052456 | 1/1981 | United Kingdom . |
| 2052457 | 1/1981 | United Kingdom . |

OTHER PUBLICATIONS

Automatische Lagerung von Blechbunden, dhf-Kennziffer 162.

Primary Examiner—Frank E. Werner
Attorney, Agent, or Firm—Sughrue, Mion, Zinn, Macpeak & Seas

[57] ABSTRACT

A method and device for storing paper rolls in a storage area where the rolls are delivered and stored one above the other in recumbent fashion, and from where they are retrieved for further processing. The storage device includes a separate transport carriage for moving the paper rolls from a storing device into corridors in the storage shelving and back from storage to the storing device. To obviate the need for pallets, the paper rolls are stored in a recumbent position on a carrier surface which, supported on each side by a high supporting wall forming part of the running track of the transport carriage, adapts to the form of the circumference of the paper roll thereby allowing easily handling of the paper rolls.

17 Claims, 3 Drawing Sheets

METHOD AND APPARATUS FOR STORING PAPER ROLLS IN A STORAGE SHELVING

The present invention relates to a method and apparatus for storing paper rolls in a storage area where the rolls are deliverd and stored one above the other and from where they are retrieved for further processing.

Method and a similar apparatus are proposed in the Finnish patent application 864705 and accordingly one object of the present invention is to further develop and improve this method and apparatus.

The method of the invention is characterized in that the storing means comprises a separate transport carriage for moving paper rolls from the storing means into the longish corridors in the storage shelving and back from the storage to the storing means. The invention optimizes the utilization of the storage space in both vertical and horizontal directions. Thus, e.g. in the lengthwise direction of a shelving corridor, the corridor may accommodate a larger number of short rolls than of long rolls, which means that the utilization rate of the store can be optimized. The utilization rate is calculated and optimized by a computer.

A preferred embodiment of the invention is characterized in that the paper rolls are brought into the store in a recumbent position by a forklift truck and deposited on a reception station, where the transport carriage of the storing means picks them up either singly or several rolls at a time and takes them to the storing means, which then moves to a definite place in the store, whereupon the transport carriage takes the roll(s) into a shelving corridor reserved for the sort of roll in question. As the rolls are thus held in a recumbent position throughout the storage process, they are very unlikely to be damaged and the storage space in the shelving can be utilized to the optimum. Paper rolls of a given size are always stored in the same shelving corridor, reserved for the roll size in question.

The invention also relates to an apparatus for implementing the method described above. The apparatus comprises a storing means, such as a stacker, by means of which the incoming paper rolls can be placed in the store and retrieved for delivery to a processing machine. The apparatus of the invention is characterized in that the storage space consists of longish shelving corridors known in themselves, where the transport carriage of the stacker can drive in to deposit or retrieve paper rolls. The invention permits optimal utilization of the storage space in vertical as well as lengthwise and sideways directions. In principle, such a store with the necessary equipment can be built in any space.

An embodiment of the invention is characterized in that the carriage support of the stacker can be rotated through 180° around its vertical axis so as to allow the transport carriage resting on it to be turned in such manner that the carriage is able to move forwards, i.e. with the lifting fork first, into the shelving corridors on both sides of the stacker. Thus the transport carriage can serve two separate sets of storage shelves on either side of the stacker.

An embodiment of the invention is further characterized in that each shelving corridor is provided with a pair of U-shaped tracks connected to each other by a concave carrier surface on which the paper rolls can be deposited for storage, said U-shaped tracks serving as running tracks for the wheels of the transport carriage. Such a solution is cheap and prevents the outer layer of the paper roll from being damaged by the weight of the roll itself, because the supporting surface of the roll is sufficiently large.

The carrier surface may also consist e.g. of a bandlike or similar structure which is attached to a supporting wall and sustains high tensile stresses. Due to the weight of the paper roll, the carrier surface undergoes an elastic deformation that allows it to adapt to the circular form of the roll. For this adaptation, the elasticity of the supporting wall itself is also utilized.

According to another feature of the present invention, an elastic steel plate is used as a carrier surface, the plate being of a sufficiently thin construction to permit elastic deformation and adaptation to the circumferential form of the paper roll as required. Since the carrier surface is only subject to tensile forces, a relatively thin plate can be used in this solution.

In accordance with yet another feature of the present invention structural simplifications and possibilities of achieving the desired adaptation of the carrier surface to the cirucmferential form of the paper rolls in a simple manner are realized.

The invention is described in the following by the aid of an example, referring to the drawings attached, wherein.

Figure 1:
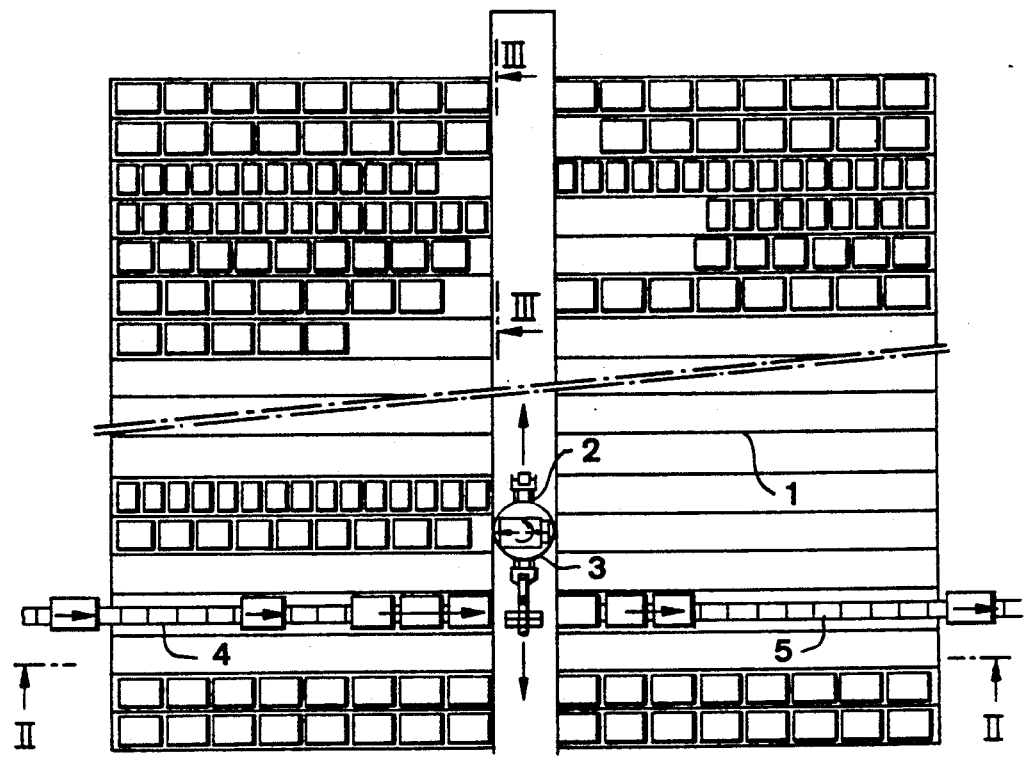
FIG. 1 represents a top view of the store.
Figure 2:
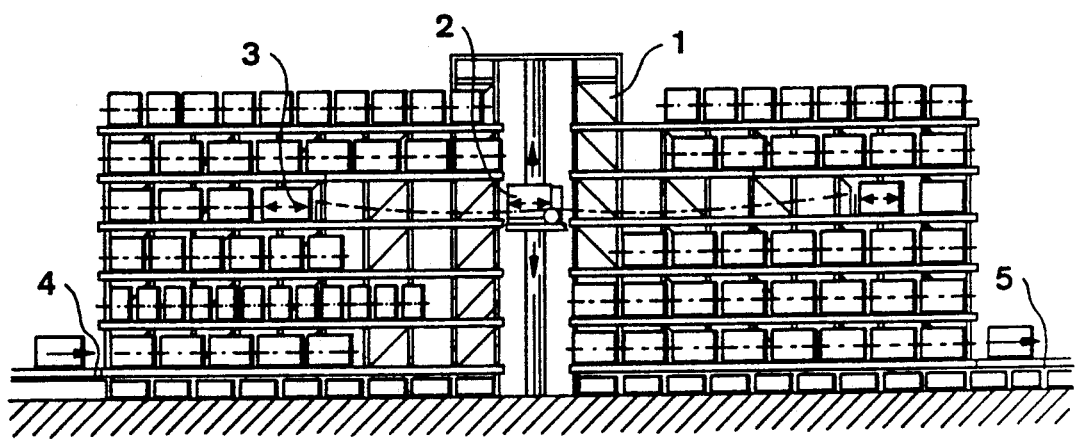
FIG. 2 shows a cross section of the store in FIG. 1 along line II—II.
Figure 3:
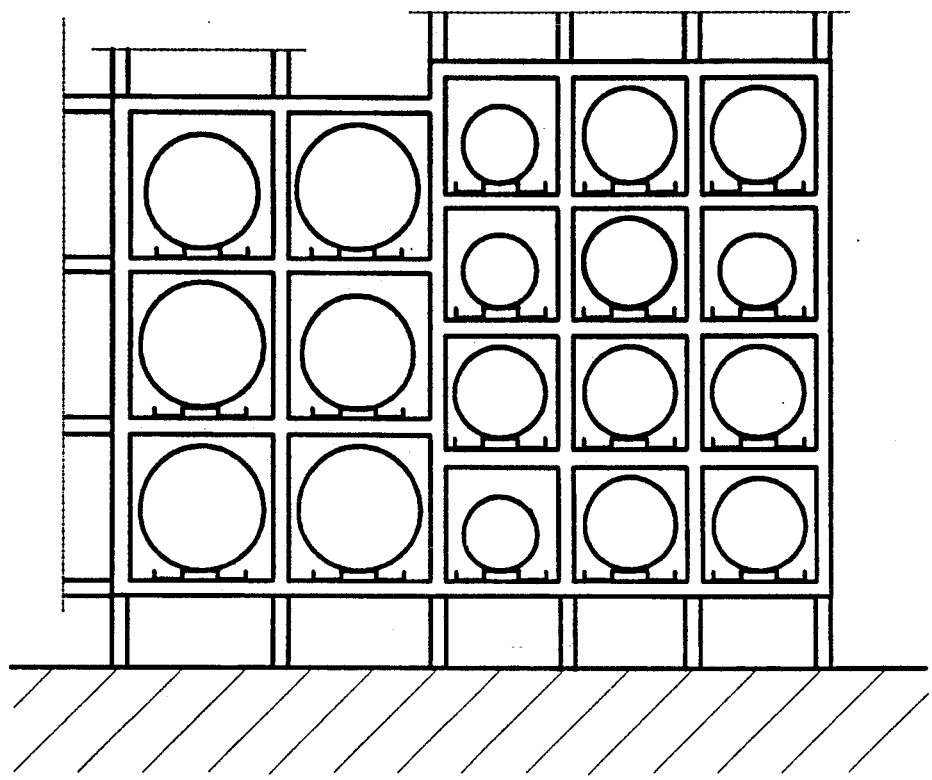
FIG. 3 shows a cross section of the store in FIG. 1 along line III—III.
Figure 4:
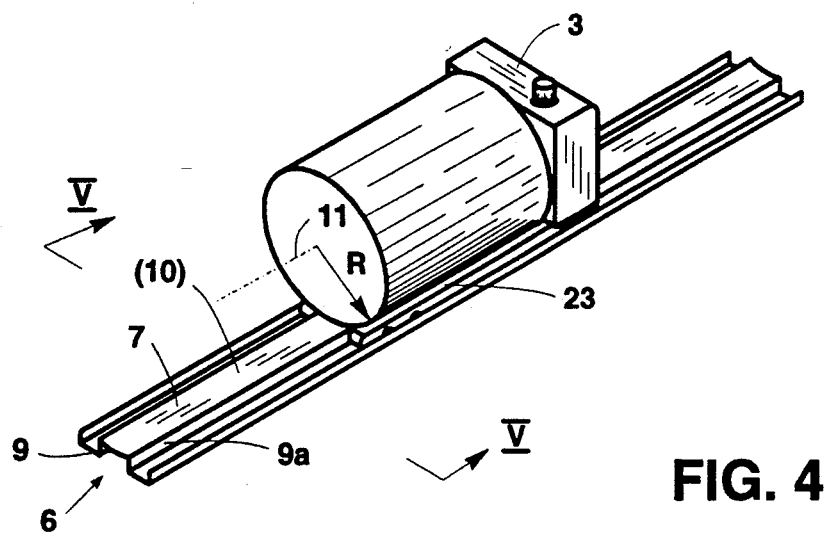
FIG. 4 shows an oblique top view of a transport carriage with a paper roll.

Referring to FIGS. 1 and 2, a fork-lift truck delivers one or more paper rolls at a time to a reception station 4, where the rolls are deposited in succession, forming a line and held in a recumbent position. At this stage, data relating to the dimensions and paper quality of each roll is automatically read from a bar code and stored in a memory of the control system of the store, or the data is inputted via a manual switch by the truck operator. A transport carriage 3 of a stacker 2 retrieves the paper roll from the reception station and then returns to the stacker which then moves the carriage and the paper roll resting theron to a given location in the store. The transport carriage 3 then delivers the roll further into the appropriate corridor in the shelving, thereby filling, the corridors with paper rolls. When a processing machine needs a given paper roll, the stacker first locates the right corridor, whereupon the transport carriage 3 fetches the paper roll from the corridor and returns back with the paper roll to the stacker, which then takes the carriage and the paper roll resting thereon to the delivery station 5, from where the roll is finally transported to the processing machine with a fork-lift truck or an automatically guided vehicle. The store includes two opposite shelving blocks, between which the stacker moves. The stacker is provided with a carriage support which can be rotated through 180° about its vertical axis so as to allow the transport carriage resting thereon to be rotated such that it can enter each of the shelving corridors while moving forwards, i.e. with the lifting fork first. The shelving corridors are provided with U-shaped tracks connected to each other by a concave surface on which the paper rolls can be deposited for storage. The U-shaped tracks serve as running tracks for the wheels of the transport carriage. Since the paper rolls are held in a recumbent position at all stages of the storage process, there is no risk of rolls falling over, which is often possible when the rolls are stored in an upright position one above the other. Accordingly method and apparatus of the invention permit an optimal utilization of the store's capacity.

Figure 5:
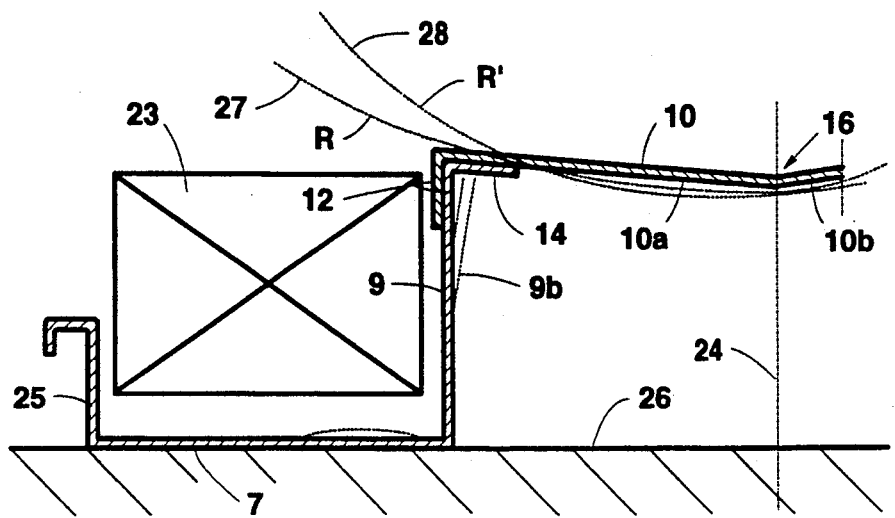
FIG. 5 shows a magnified cross section of the running track in FIG. 4 along line V—V.

As illustrated by FIG. 5, which shows only the left-hand profile 7 of the running track 4, the right-hand profile 8 is arranged in mirror symmetry on the other side of the mirror plane 24. The profile 7 is a rectangular U-profile shape provided with a high supporting wall 9 on the side facing the other rectangular profile 8. The supporting wall 9 is higher than the other side wall 25 of the profile. The rectangular profiles 7 and 8, the latter being omitted in the figure, are fixedly mounted on the bottom 26 of the storage shelf 3. In one embodiment, the profiles 7 and 8 are made of a steel plate.

The top edge of the supporting wall 9 of the rectangular profile 7 is bent into an angle towards the other profile 8 (not shown) so as to form a protrusion 14 serving as a seat for the carrier plate 10. The bent edge 12 of the carrier plate is attached to the upper part of the supporting wall 9 (e.g., with screws). The said plate 10 includes an elastic steel plate which is thinner than the material of the rectangular profile 7. The carrier plate 10 is provided with a deflection 16 along the line of the mirror plane 24, wherein the deflection 16 is produced when the two equal portions 10a and 10b of the plate meet forming an obtuse angle $\alpha$ of about 170°. Thus, a carrier surface 10 for the paper rolls is provided in the middle of the running track 4 thus formed. FIG. 5 also illustrates the deformations of the elastic plate 10 caused by the weight of the paper roll 2, and also the deformations occurring simultaneously in the upper part 9b of the supporting wall 9. When a paper roll 2 of diameter R is placed on the carrier plate 10, the weight of the roll causes the plate 10 to adapt to the form of the circumference 27 of the roll. The same occurs when a roll of a smaller diameter R' is deposited on the plate, but in this case both the carrier plate 10 and the supporting wall 9 undergo a larger deformation than in the case of a roll with the larger diameter R. In any case, the result is that the carrier surface 10 is adapted in the required manner to the form of the circumference 27 or 28 of the paper roll. Thus, the bearing surface at the circumference of the paper roll 2 is large enough to prevent any flattening or undesirable deformation of the outer layer of the roll 2.

Instead of a steel plate 10, it is also possible to use a mat made of a plastic or textile material of sufficient tensile strength. As the mat is essentially subject only to the tensile forces resulting from the weight of the paper rolls, such a mat may be applicable as a carrier surface 10.

Figure 6:
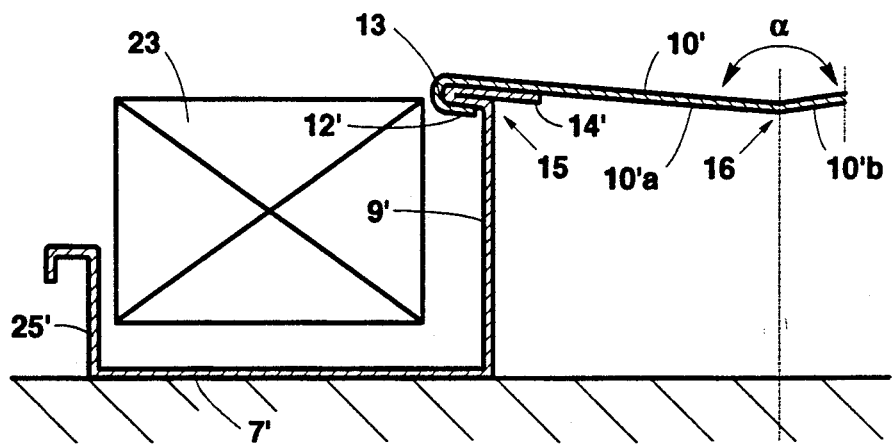
FIG. 6 shows a corresponding section through the running track of a different embodiment.

FIG. 6 shows how the mounting of the carrier surface 10, again composed of a plate, can be implemented in a very simple manner by bending the edges 12' of the plate 10' around a step-shaped protrusion 13 pointing outwards toward the other side 25' of the rectangular profile 7'. When the upper edge of the supporting wall 9' is folded as shown, a seat protrusion 14' results (analogous to the protrusion 14 in FIG. 5), which transmits the undesirable deformation of the carrier plate 10' in the seat region to the supporting wall 9'. In other respects, the design of the carrier plate 10' is analogous to the embodiment of FIG. 5. Naturally the deflection 16 can be omitted. However, the embodiment presented provides the advantage that, when a paper roll is first deposited on the plate 10, it touches the plate along two lines of contact instead of one. This makes it possible to avoid undesirable effects on the outer layer of the paper roll.

We claim:
1. A method of storing paper rolls in a storage facility comprising a reception station for receiving rolls coming into said facility, a delivery station for receiving rolls leaving said facility, storing means including a transport carriage, and a main access corridor and shelving corridors extending transversely along a side of said main access corridor, said paper rolls being stored end to end in a recumbent position upon a flexible generally concave carrier surface of said shelving corridor, said reception and delivery stations and said corridors being adapted to communicate by way of said storing means, said method comprising steps of:
   (a) one of delivering from said reception station to said main access corridor at least one of said paper rolls, using said transport carriage of said storing means and delivering to said delivery station from said main access corridor at least one of said paper rolls using said transport carriage of said storing means;
   (b) one of displacing said storing means to a first predetermined location within said main access corridor of said storage facility to a selected shelving corridor and displacing said storing means from a second predetermined location within a selected shelving corridor to said main access corridor; and
   (c) displacing said transport carriage along said shelving corridor for one of delivering to said flexible, generally concave carrier surface of said selected shelving corridor and retrieving from said flexible, generally concave carrier surface of said selected shelving corridor, at least one of said paper rolls.

2. A method according to claim 1, wherein each of said paper rolls having an identity, said method further comprising the steps of:
   supplying said paper rolls to said reception station in a recumbent position; and
   recording data representative of the identity of each paper roll such that said storing means can one of deliver to said selected shelving corridor and retrieve from said selected shelving corridor said paper rolls according to their identity, the displacement of said storing means being monitored.

3. A method according to claim 2, wherein said storage space being optimized such that said shelving corridors have dimensions of a transversal area selected as required for a particular application, and said selected shelving corridor being dependent on the dimensions of said transversal area of said shelving corridors and said identity of each paper roll.

4. A method according to claim 2, wherein the steps of delivering and retrieving the paper rolls comprise:
   rotating said transport carriage to a desired position using a rotatable carriage support means of said storing means;
   lifting said transport carriage to a desired height using a stacker of said storing means;
   advancing said transport carriage into said selected shelving corridor to one of delivering at least the paper roll from said transport carriage to said selected shelving corridor and retrieving from said selected shelving corridor to said transport carriage; and retrieving said transport carriage back on said carriage support means.

5. A method according to claim 4, wherein said transport carriage comprises a lifting fork for lifting at least one paper roll, said method further comprising the step of resting and rotating said transport carriage on said rotatable carriage support means through 180° around a vertical axis thereby enabling said transport carriage, to enter said selected shelving corridor with said lifting fork leading.

6. A method according to claim 4, wherein the steps of advancing and retrieving said transport carriage to and from said selected shelving corridor comprise:
   placing said transport carriage having a pair of parallel rails on a pair of running tracks, said pair of running tracks corresponding to said pair of parallel rails provided on said transport carriage, said transport carriage having access to each of said shelving corridors; and
   displacing said transport carriage along said selected shelving corridor on said running tracks to one of retrieving and depositing said paper roll.

7. A storage shelving apparatus for the storage of paper rolls in a storage space comprising a plurality of long adjacent shelving corridors extending transversely along a side of a main access corridor, the apparatus comprising:
   a transport carriage operative to transport said paper rolls;
   a pair of running tracks provided in each shelving corridor of said plurality of shelving corridors, adapted to allow displacement of said transport carriage in the delivery and retrieval of said paper rolls;
   an inside supporting wall and outer wall extending along each running track of said pair of running tracks; and
   a flexible generally concave carrier surface adapted to receive said paper rolls, connecting said inside supporting walls of said pair of running tracks to each other such that when the roll of paper is deposited thereon, the roll causes flexing of said carrier surface thereby substantially adapting said carrier surface to an outer circumference of said roll in contact therewith so as to substantially reduce deformation of said outer circumference of said roll.

8. A storage shelving apparatus according to claim 7, wherein flexure of said flexible carrier surface caused by the weight of said paper rolls is permitted by providing said inside supporting walls of a predetermined height, so that said supporting walls serving as a support for said flexible carrier surface are higher than the outer walls of said running tracks.

9. A storage shelving apparatus according to claim 8, wherein said carrier surface comprises an elastic plate.

10. A storage shelving apparatus according to claim 9, wherein said elastic plate comprising said carrier surface is provided with a deflection along a longitudinal centerline thereof.

11. A storage shelving apparatus according to claim 10, wherein said deflection is formed by two essentially planar portions of said carrier surface meeting at an obtuse angle ($\alpha$) of approximately 160°-170°.

12. A storage shelving apparatus according to any one of claims 9, 10, and 11, wherein said carrier surface is provided with bent longitudinal edges which attach to said supporting walls.

13. A storage shelving apparatus according to claim 12, wherein said bent longitudinal edges are suspended on protrusions of said supporting walls, said protrusions pointing in a direction away from an adjacent supporting wall.

14. A storage shelving apparatus according to claim 8, wherein said supporting walls comprise vertical, elastically flexible sheets.

15. A storage shelving apparatus according to claim 14, wherein said supporting walls comprise a portion of U-shaped tracks for guiding said transport carriage.

16. A storage shelving apparatus according to claim 14, characterized in that upper portions of said supporting walls are provided with transverse protrusions which serve as seats for sides of said carrier surface.

17. A storage shelving apparatus according to claim 16, wherein said transverse protrusions comprise bent upper edges of said supporting walls.

* * * * *